United States Patent [19]

Mink et al.

[11] 4,384,984

[45] * May 24, 1983

[54] TITANIUM CATALYST FOR POLYMERIZING OLEFINS

[75] Inventors: Robert I. Mink; Ronald A. Epstein, both of Yonkers, N.Y.

[73] Assignee: Stauffer Chemical Company, Westport, Conn.

[*] Notice: The portion of the term of this patent subsequent to Apr. 20, 1999, has been disclaimed.

[21] Appl. No.: 307,036

[22] Filed: Sep. 30, 1981

[51] Int. Cl.³ ............................. C08F 4/02; C08F 4/64
[52] U.S. Cl. ................................ 252/429 B; 526/114; 526/125
[58] Field of Search .................................. 252/429 B

[56] References Cited

U.S. PATENT DOCUMENTS 3,412,174 11/1968 Kroll ............................ 252/429 B X
4,146,502 3/1979 Yokoyama et al. ............. 252/429 B
4,325,836 4/1982 Epstein et al. .................. 252/429 B Primary Examiner—Patrick Garvin

[57] ABSTRACT

A catalytic system for polymerizing olefins contains an organoaluminum compound and a component containing titanium halide on a support of a magnesium or manganese compound containing halogen, which is obtained by (i) pretreating the support with an ether, (ii) intimately contacting the support with an electron donor, to activate it, and (iii) reacting the activated support with a titanium halide, such as titanium tetrachloride.

The invention also includes the process for preparing the titanium component, the composition of the titanium component, and the use of the novel catalytic system to polymerize olefins.

39 Claims, No Drawings

TITANIUM CATALYST FOR POLYMERIZING OLEFINS

BACKGROUND OF THE INVENTION

This invention relates to a catalytic system for polymerizing olefins, a novel component of the system containing titanium halide, a process for preparing the novel component containing titanium halide, and the use of the system in polymerizing olefins, especially propylene.

The polymerization of olefins by heterogeneous complex catalytic systems, often termed Ziegler-Natta catalysis, has been well-known for over 25 years. Generally, there are two components in this type of system: one based on an organoaluminum compound or its substitute, the other containing a titanium or other transition metal halide. Although thousands of such catalytic systems have been disclosed, there is always a quest for improvement in two important properties: activity and isotactic index.

Activity is measured by the grams of polyolefin produced per gram of titanium component or other transition metal component employed in the catalytic system. The higher the activity, the lower the amount of metallic ash and corrosive halide left in the polymer. If the activity is high enough, e.g. $\geq 6,000$, then the de-ashing step in processing the final polyolefin can be omitted—an important improvement.

For olefins, such as propylene, which can form isotactic structures, the higher the isotactic index, the better the physical properties of the polymer. Isotactic polypropylene is more ordered, less soluble in halocarbons or hydrocarbons, and useful for its higher strength than the more soluble atactic form. Isotactic indices of 93 or higher are favored for commercial polypropylene.

Previously Kashiwa et al. disclosed in U.S. Pat. No. 3,642,746 a process for polymerizing olefins by means of a catalytic component supported on a metal dihalide, which has been treated with an electron-donor compound and then reacted with either titanium tetrachloride or vanadium tetrachloride. Among the electron-donor compounds are aliphatic and cyclic ethers.

U.S. Pat. No. 4,145,313 granted to Langer discloses $TiCl_4$ supported on $MgCl_2$ and one or more Lewis bases, among which ethers are named, as catalysts and branched secondary or tertiary trialkylaluminum compounds and other organometallics as cocatalysts. Ethers may also be complexed with the cocatalysts.

Similarly U.S. Pat. No. 4,279,776 granted to Shiga et al. discloses a three-component catalyst system wherein component A, an organomagnesium compound, is synthesized in the presence of an ether, is then caused to react with a halogen-containing compound of silicon or a halogeno-aluminum compound to form a solid product, which is caused to react with an electron donor selected from one of twelve classes of compounds, one of which is an ether, and then caused to react with $TiCl_4$; component B is an organoaluminum activating agent; and component C is an electron donor selected from one of twelve classes of compounds, one of which is an ether.

U.S. Pat. No. 3,888,835 granted to Ito discloses a catalyst system comprising a copulverized catalyst of $TiCl_4$ or $TiCl_3$ material, and aluminum halide-ether complex, and magnesium halide employed with an organoaluminum cocatalyst. The aluminum halide-ether complex is said to cause marked diminution of the surface area of the catalyst component.

All four of the disclosures above are incorporated by reference into this application.

It is an object of this present invention to provide a catalytic system for polymerizing olefins, such as propylene, so active that de-ashing may be omitted and so constituted that polymer with a high isotactic index is produced. Other objects of this invention will be apparent to those skilled in the art.

SUMMARY OF THE INVENTION

Surprisingly, both a high activity and high isotactic index (II) can be achieved by employing the novel catalysts of the present invention for the polymerization of olefins, particularly ethylene and propylene. The novel catalytic system comprises:

(a) a component containing an organoaluminum compound, and (b) a component containing a titanium halide obtained by a process comprising:
  (i) pretreating a magnesium or manganese compound containing halogen with an ether to produce a support material,
  (ii) intimately contacting the support material with an electron donor to produce an activated product, and
  (iii) reacting the activated product with a titanium halide compound.

For another aspect of the present invention the novel component containing a titanium halide and a process for producing the novel component containing a titanium halide are provided.

For still another aspect of the present invention a process for employing the novel catalytic system to polymerize olefins is provided.

DETAILED DESCRIPTION OF THE INVENTION

The present invention is broadly applicable to the polymerization of olefinic monomers especially 1-olefins including ethylene, dienes especially conjugated ones such as butadiene, and those other olefins which are only marginally polymerizable, such a 2-butene. The preferred monomeric olefins are those corresponding to the formula $R-CH=CH_2$, wherein R is an alkyl radical containing up to 12 carbon atoms inclusive and hydrogen. Among the preferred, olefinic monomers are ethylene, propylene, 1-butene, 1,3-butadiene, 1-pentene, 4-methyl-1 pentene, 1-hexene, and the like. These monomers may be employed individually or in comonomeric mixtures such as ethylene/propylene, ethylene/propylene/butadiene, and the like.

Although for illustrating the present invention the polymerization of propylene is described herein as an example, the invention is by no means limited to any one olefinic monomer.

The component (a) containing an organoaluminum compound is well-known to those skilled in the art of heterogeneous complex (Ziegler-Natta) addition polymerization. The component may be selected from the following compounds:

trialkyl aluminums such as triethylaluminum, triisobutylaluminum, and trihexylaluminum, dialkyl aluminum halides such as diethylaluminum chloride, diethylaluminum bromide, and dibutylaluminum chloride, alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide.

An electron donor such as an alkyl ester of an aromatic acid may be used in conjunction with component (a). Methyl toluate and ethyl anisate are examples of such electron donors. Electron donors in component (a) are advantageously used in molar ratio from about 1:10 to 1:1 with respect to the aluminum alkyl.

The preferred support for practicing the instant invention is anhydrous magnesium dichloride, but other support materials may be selected from magnesium hydroxychloride, magnesium alkoxychloride, magnesium bromide, magnesium hydroxybromide, magnesium alkoxybromide; manganese chloride, manganese bromide, manganese hydroxychloride, manganese hydroxybromide, and manganese alkoxyhalide. Magnesium phenoxy halide and magnesium substituted phenoxy halides may also be used. Preferred substituents in the phenoxy moiety are alkyl groups containing 1 to 5 carbon atoms, halogen groups such as chloride or bromine, and the nitro group. As in chloro-substituted phenoxy magnesium compounds, the magnesium or manganese compound containing halogen need not have the halogen atom directly bonded to the magnesium or manganese atom.

The support, chosen from the halogenated materials cited above, may also be partially converted to alcoholate groups. Furthermore, the support may contain diluents, up to about 70 percent, of inert, powdered material such as inorganic carbonates, sulfates, borates, or oxides. Examples of such diluents are dry NaCl, KCl, LiCl, $CaCO_3$, $BaCO_3$, $Na_2SO_4$, $K_2CO_3$, $K_2CO_3$, $Na_2B_4O_7$, $CaSO_4$, $B_2O_3$, $Al_2O_3$, $SiO_2$, $TiO_2$ and the like.

The first step (i) in the process of obtaining novel component (b) containing a titanium halide is pretreatment of the support material with an ether. Pretreatment with an ether can take place at any temperature between about 0° and about 200° C., but a pretreatment temperature between about 50° and 100° C. is preferred depending on the boiling point of the ether. Depending on the temperature of pretreatment, the pretreatment time can very from a few minutes to a day or more with shorter pretreatment times being more appropriate with higher pretreatment temperatures. The preferred time is from about one-half to about four hours. Especially preferred is a pretreatment time from one to three hours at about 50° to about 60° C. Normally a large excess of ether is employed as the pretreating medium, but inert hydrocarbon diluents may also be employed in the ether.

Symmetrical or asymmetrical ethers may be chosen especially those with hydrocarbyl radicals, that is aliphatic, cycloaliphatic or aromatic moieties. The hydrocarbyl radicals may have substituents, however, such as halogen, nitro, cyano or other hydrocarbyl groups which are nonreactive during the processing of the catalyst support and the subsequent polymerization of olefins. The ether may bear heterocyclic groups such as pyridyl or thienyl.

Some representative ethers suitable for post-treating the copulverized support material are dimethyl ether, methyl ethyl ether, diethyl ether, dipropyl ether, diisopropyl ether, dibutyl ether, diisobutyl ether, diisoamyl ether, dioctyl ether, didodecyl ether, diallyl ether, isobutyl vinyl ether, dioxane, lower polyethylene glycols up to about 500 molecular weight, lower polypropylene glycols up to about 600 molecular weight, ethylene glycol dimethyl ether, ethylene glycol diethyl ether, ethoxyethoxyethylene glycol ethyl ether, tetrahydrofuran, diphenyl ether, ditolyl ether, anisole, dimethoxybenzene. Among the ethers aliphatic compounds are preferred. Especially preferred is di-n-butyl ether.

After pretreatment with the ether the support material is normally filtered, washed with a volatile hydrocarbon solvent such as heptane, and dried. No one or all of these three steps is necessary, however, for carrying out the process of this invention. If convenient, separation, washing and drying is preferred.

The second step (ii) in the process of obtaining the novel component containing a titanium halide is intimately contacting the pretreated magnesium or manganese compound or a mixture thereof containing halogen support material with an electron donor activating agent. The preferred electron donor activating agents are carboxylic esters or titanium halide complexed with a carboxylic ester. The most preferred electron donor activating agent is ethyl benzoate.$TiCl_4$ complex. The amount of electron donor may vary from about 0.01 to about equal weight of the support material. Preferably about 0.05 to about 0.2 mole electron donor per mole support material is used.

By "intimately contacting" any process at the molecular or working particle level of matter is intended rather than mere mixing of diverse materials or phases. The preferred method of intimately contacting is by copulverization. Copulverization may be carried out in any suitable milling equipment such as a ball mill, a hammer mill, a vibratory mill, a grinding mill, or the like. Use of a ball mill is preferred, especially employing stainless steel balls, but ceramic, glass, or balls of other material may be substituted.

Copulverization may be carried out in the presence of an organic or inorganic pulverization aid which may be simple compounds or polymers. Representative pulverization aids are kerosene, polystyrene, polypropylene, organosiloxanes, boron oxide, silicon oxide and aluminum oxides. Of the cited pulverization aids the polysiloxanes, which also have electron-donating properties are preferred. From about 0.001 to about equal weight of such pulverization aid may be used in each charge milled.

The intimate contact or copulverizing step (ii) of the present invention may be carried out from about one hour to about 10 days. A time of from about two to about five days is preferred for the copulverization step (ii).

Electron donors are compounds, usually but not necessarily organic, containing one or more oxygen, nitrogen, phosphorus, silicon or sulfur atoms which can form complexes with the magnesium or manganese support materials containing halogen atoms. Often the electron donors are termed Lewis bases, since the support materials containing halogen atoms often are Lewis acids.

Among the classes of compounds containing oxygen suitable for furnishing electron donors are: aliphatic and aromatic ethers, aliphatic carboxylic esters, aromatic carboxylic esters, cyclic esters or carbonic acid, alcohols, phenols, aldehydes, ketones, aliphatic and aromatic carboxylic acids, lactones, and carboxylic acyl halides. Of these the aromatic carboxylic esters are preferred.

Among the classes of compounds containing nitrogen suitable for furnishing electron donors are aliphatic amines and polyamines, aromatic amines, heterocyclic amines, nitriles, carbamates, aromatic isocyanates, and aromatic azo compounds. Electron donors containing both oxygen and nitrogen atoms may be used such as aliphatic and aromatic amides, nitrocompounds, or guanidine and its alkyl-substituted derivatives.

Other classes of electron donors include phosphines, phosphoroamides, sulfides, mercaptans, thioethers, thioesters, organoalkoxysilanes, organoaryloxysilanes, aminosilanes, organosilicon isocyanates, and organopolysilanes, organopolysiloxanes, and polysilazines.

Examples of electron-donor compounds from some of the classes listed above are: ethyl benzoate, ethyl anisate, ethyl toluate, ethyl acetate, diethyl carbonate, γ-butyrolactone, benzoic acid, toluic acids, acetone, acetophenone, nitrobenzene, veratrol, tetramethylenediamine, dimethyl acetamide, methyl carbamate, toluene diisocyanate, benzonitrile, N-methyl pyrrolidone, phenol, and thiophenol. Especially preferred among these electron donors is ethyl benzoate and its TiCl$_4$ complex.

The electron donor may be placed in the pulverizing apparatus before, during, or after some of the pulverizing time, as long as the support and the electron donor are intimately contacted during some of the pulverization. More than one electron donor may be used and the several donors may be added in any convenient fashion. The pulverization aid may also function as an electron donor.

The third major step in the process of this invention is reaction with a titanium compound in order to prepare the titanium component of the coordinate complex polymerization catalyst.

The titanium compound employed for the reactive step may be represented by the formula:

Ti X$_n$ (OR')$_p$ (NR$^2$R$^3$)$_q$ (OCOR$^4$)$_r$ wherein X is a chlorine, bromine, or iodine atom; R', R$^2$, R$^3$, and R$^4$ may be the same or different and are hydrocarbyl radicals having from 1 to about 12 carbon atoms; n is a number of from 0 to 4; p, q, and r are numbers from 0 to 4, and n+p+q+r is 4.

Some examples of titanium halocompounds useful in performing the reactive step are titanium tetrachloride, titanium tetrabromide, titanium tetraiodide, methoxytitanium trichloride, dimethoxytitanium dichloride, ethoxytitanium trichloride, dimethylaminotitanium trichloride, bis(dimethylamino)titanium dichloride and titanium benzoate trichloride. Preferably the reactive titanium compound is a liquid, but this is not necessary if a convenient, inert solvent can be found for the reagent. The titanium compound can be employed neat or in a suitable solvent. The ratio of titanium compound to magnesium support material can range from about 0.1 to about 100 molar.

Titanium trichloride material may also be used.

The titanium reaction can be carried out at any temperature from about 25° to about 200° C., but temperatures from about 75° to about 150° C. are preferred. This reaction can be carried out from a few minutes to several hours, but a reaction time of one-half to four hours is preferred.

After the ether pretreatment copulverization, and titanium-reaction steps, the product is preferably separated from the liquid medium, washed with an inert solvent such as heptane, and dried, preferably by vacuum drying at ambient temperature. Because this supported titanium catalyst component is sensitive to air and moisture it should be stored in a dry, inert atmosphere.

The titanium catalyst component which is a product of the process of the present invention may be used along with a suitable organoaluminum compound as a catalyst for the polymerization of olefins such as ethylene, propylene, butene and butadiene, or copolymers of these olefins with each other and other olefins, in the heterogeneous complex (Ziegler-Natta) type of polymerization in conventional fashion, as is well-known. This polymerization is illustrated in the Examples. The molar ratio of organoaluminum compound to titanium in the treated and modified titanium component of the present invention may range from about 2000:1 to about 0.5:1; the preferred molar ratio is from about 200:1 to about 100:1.

Having described the present invention above, we now illustrate it in the following Examples. These Examples, however, do not limit the present invention, which may be carried out by other means but still remain within the scope of the present disclosure.

EXAMPLE 1

This Example illustrates the preparation of a titanium catalyst component of the present invention.

Magnesium chloride (20 g, 210 mmol) was suspended in 200 ml heptane in a 500-ml, three-necked flask equipped with a stirrer, heater, and thermometer. To this suspension di-n-butyl ether (26.6 ml, 157 mmol) is added for two hours of treatment at 55° C. After treatment the suspension was filtered, the precipitate washed with heptane (700 ml), and vacuum-dried.

The treated support (14 g), an ethyl benzoate.titanium tetrachloride complex (2 g, 6 mmol), and silicone oil (1 ml General Electric Co., SF 96-100) were charged into a 1-l, stainless steel ball mill with 875 g, 1.6-cm diameter stainless steel balls and milled at ambient temperature for six days. The milled support was then sieved through a standard 140-mesh screen.

The milled product (5.3 g) was then suspended in 10 ml heptane in a 250-ml, three-necked flask equipped with a heater, magnetic stirrer, and thermometer. Sixty ml TiCl$_4$ was then added and the mixture kept at 100° C. for two hours. After filtration the precipitate was filtered, washed with heptane (800 ml), and dried under vacuum overnight. The product was then screened through a standard 140-mesh screen.

EXAMPLE 2

This Example illustrates standard test conditions for slurry polymerization, one of the techniques for utilizing the present invention.

A polymerization reactor in the form of a four-liter, jacketed autoclave was equipped with a heater, purging ports, thermocouple, and mechanical stirrer. It was charged with two liters of dry heptane and brought to 50°±5° C. A nitrogen purge was commenced, and 12 mmol triethylaluminum was added by syringe and stirred for about 10 seconds. Then 3 mmol methyl p-toluate electron donor was added through the entry port, and the reaction mixture stirred for about 10 seconds again. At this point 50 mg of the solid titanium component of the catalyst system, made in Example 1, was added. Polymer-grade propylene was then pumped into the reactor until a pressure of 10 atmospheres was reached at 65° C. During the polymerization more propylene was added to maintain the pressure at 10 atmospheres at 65° C. for 1½ hours, the duration of the standard test.

After the 1½ hour standard test the polymer was filtered, washed with isopropyl alcohol, ovendried at 70° C., and weighed, thus giving a weight termed Dry Polymer. In order to determine the amount of heptane-soluble polymer formed the reaction solvent filtrate was evaporated to dryness.

EXAMPLE 3

This Example illustrates standard test conditions for bulk polymerization, another technique for utilizing the present invention.

As in Example 2, a 2.8 l. jacketed autoclave was equipped with a heater, purging ports, thermocouple, and mechanical stirrer. The nitrogen purge, addition of organoaluminum compound, electron donor, and titanium component of the present invention was carried out as in Example 2. Then 2 l. of liquid propylene was added and brought to 70° C. Again the standard polymerization test was run for 1½ hours. At the end of the polymerization time excess propylene was vented from the reactor. The polymer was collected, dried at 70° C., and weighed to give the amount of Dry Polymer.

For both the slurry test of Example 2 and the bulk polymerization of Example 3, the activity of the titanium component of the present invention was defined as follows:

$$\text{Activity}\left(\frac{\text{g polymer}}{\text{g catalyst component}}\right) = \frac{\text{Dry Polymer (g) plus Heptane-Soluble Polymer (g)}}{\text{Titanium Component (g)}}$$

The amount of polymer insoluble in heptane was determined by a three-hour extraction at the boiling point of heptane and termed "C$_7$." Isotactic Index (II) was then defined as:

$$II = \frac{\text{"C}_7\text{"} \times \text{Dry Polymer (g)}}{\text{Total Polymer Produced (g)}} \times 100$$

For the titanium component made in Example 1, tested by the procedure of Example 2, the results were activity 6973, isotactic index 90.1. The activity and II of the titanium component before the TiCl$_4$ post-treatment, as prepared in Example 1, were 966 and 81.6 respectively.

We claim:

1. A catalytic system for polymerizing olefins comprising:
   (a) a component containing an organoaluminum compound, and
   (b) a component containing a titanium halide obtained by a process comprising:
      (i) pretreating a magnesium or manganese compound containing halogen with an ether to produce a support material,
      (ii) intimately contacting the support material with an electron donor to produce an activated product, and
      (iii) reacting the activated product with a titanium halide compound.

2. The catalytic system of claim 1 wherein the support material is intimately contacted with an electron donor by means of copulverization.

3. The catalytic system of claim 2 wherein the copulverization is carried out in the presence of a pulverization aid.

4. The catalytic system of claim 3 wherein the pulverization aid is selected from the group consisting of hexane, heptane, kerosene, polystyrene, polypropylene, boron oxide, silicon oxide, and organosiloxanes.

5. The catalytic system of claim 1 wherein the magnesium or manganese compound containing halogen is magnesium chloride.

6. The catalytic system of claim 1 wherein the electron donor comprises an aromatic carboxylic ester containing from 7 to 20 carbon atoms, or a titanium halide complex of said ester.

7. The catalytic system of claim 6 wherein the electron donor is ethyl benzoate.TiCl$_4$.

8. The catalytic system of claim 1 wherein the ether is selected from the group consisting of aliphatic ethers containing up to 12 carbon atoms, halogenated aliphatic ethers containing up to 12 carbon atoms, aliphatic glycol ethers or half-ethers containing up to 16 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

9. The catalytic system of claim 1 wherein the ether is a symmetrical aliphatic ether.

10. The catalytic system of claim 9 wherein the symmetrical aliphatic ether is di-n-butyl ether.

11. The catalytic system of claim 1 wherein the titanium halide compound is titanium tetrachloride.

12. The catalytic system of claim 1 wherein the titanium halide compound is titanium trichloride material.

13. The catalytic system of claim 1 wherein the quantity of titanium present in the component containing a titanium halide is from about 0.1 percent to about 10 percent by weight expressed as elemental titanium.

14. A component containing titanium halide of a catalytic system for polymerizing olefins obtained by a process comprising:
   (i) pretreating a magnesium or manganese compound containing halogen with an ether to produce a support material,
   (ii) intimately contacting the support material with an electron donor to produce an activated product, and
   (iii) reacting the activated product with a titanium halide compound.

15. The component of claim 14 wherein the support material is intimately contacted with an electron donor by means of copulverization.

16. The component of claim 15 wherein the copulverization is carried out in the presence of a pulverization aid.

17. The component of claim 16 wherein the pulverization aid is selected from the group consisting of hexane, heptane, kerosene, polystyrene, polypropylene, boron oxide, silicon oxide, and organosiloxanes.

18. The component of claim 14 wherein the magnesium or manganese compound containing halogen is magnesium chloride.

19. The component of claim 14 wherein the electron donor comprises an aromatic carboxylic ester containing from 7 to 20 carbon atoms, or a titanium halide complex of said ester.

20. The component of claim 19 wherein the electron donor is ethyl benzoate.TiCl$_4$.

21. The component of claim 14 wherein the ether is selected from the group consisting of aliphatic ethers containing up to 12 carbon atoms, halogenated aliphatic ethers containing up to 12 carbon atoms, aliphatic glycol ethers or half-ethers containing up to 16 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

22. The component of claim 14 wherein the ether is a symmetrical aliphatic ether.

23. The component of claim 22 wherein the symmetrical aliphatic ether is di-n-butyl ether.

24. The component of claim 14 wherein the titanium halide compound is titanium tetrachloride.

25. The component of claim 14 wherein the titanium halide compound is titanium trichloride material.

26. The component of claim 14 wherein the quantity of titanium present in the component containing a titanium halide is from about 0.1 percent to about 10 percent by weight expressed as elemental titanium.

27. The process for producing a component containing halide of a catalytic system for polymerizing olefins comprising:
   (i) pretreating a magnesium or manganese compound containing halogen with an ether to produce a support material,
   (ii) intimately contacting the support material with an electron donor to produce an activated product, and
   (iii) reacting the activated product with a titanium halide compound.

28. The process of claim 27 wherein the support material is intimately contacted with an electron donor by means of copulverization.

29. The process of claim 28 wherein the copulverization is carried out in the presence of a pulverization aid.

30. The process of claim 29 wherein the pulverization aid is selected from the group consisting of hexane, heptane, kerosene, polystyrene, polypropylene, boron oxide, silicon oxide, and organosiloxanes.

31. The process of claim 27 wherein the magnesium or manganese compound containing halogen is magnesium chloride.

32. The process of claim 27 wherein the electron donor comprises an aromatic carboxylic ester containing from 7 to 20 carbon atoms, or a titanium halide complex of said ester.

33. The process of claim 32 wherein the electron donor is ethyl benzoate.$TiCl_4$.

34. The process of claim 27 wherein the ether is selected from the group consisting of aliphatic ethers containing up to 12 carbon atoms, halogenated aliphatic ethers containing up to 12 carbon atoms, aliphatic glycol ethers or half-ethers containing up to 16 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

35. The process of claim 27 wherein the ether is a symmetrical aliphatic ether.

36. The process of claim 35 wherein the symmetrical aliphatic ether is di-n-butyl ether.

37. The process of claim 27 wherein the titanium halide compound is titanium tetrachloride.

38. The process of claim 27 wherein the titanium halide compound is titanium trichloride material.

39. The process of claim 27 wherein the quantity of titanium present in the component containing a titanium halide is from about 0.1 percent to about 10 percent by weight expressed as elemental titanium.

* * * * *